US012723634B2

(12) United States Patent
Kuroda

(10) Patent No.: US 12,723,634 B2
(45) Date of Patent: Sep. 1, 2026

(54) ANTI-VIBRATION DEVICE

(71) Applicant: Toyo Tire Corporation, Itami (JP)

(72) Inventor: Yasuhiro Kuroda, Itami (JP)

(73) Assignee: Toyo Tire Corporation, Itami (JP)

( * ) Notice: Subject to any disclaimer, the term of this patent is extended or adjusted under 35 U.S.C. 154(b) by 451 days.

(21) Appl. No.: 18/243,945

(22) Filed: Sep. 8, 2023

(65) Prior Publication Data

US 2024/0093745 A1 Mar. 21, 2024

(30) Foreign Application Priority Data

Sep. 21, 2022 (JP) ................................ 2022-149636

(51) Int. Cl.
*F16F 1/38* (2006.01)
*B60G 21/055* (2006.01)

(52) U.S. Cl.
CPC ............ *F16F 1/38* (2013.01); *F16F 2234/02* (2013.01)

(58) Field of Classification Search
CPC .... F16F 1/38; F16F 2234/02; B60G 21/0551; B60G 2204/1222
See application file for complete search history.

(56) References Cited

U.S. PATENT DOCUMENTS 9,546,705 B2 * 1/2017 Ishimatsu ............. F16F 1/3835
11,584,189 B2 * 2/2023 Lee .................... B60G 21/0551
11,820,191 B2 * 11/2023 Nakagaki .............. F16F 1/3876
2015/0008630 A1 * 1/2015 Ishimatsu ............. F16F 1/3842 267/279
2016/0001627 A1 * 1/2016 Kobayashi ......... B60G 21/0551 248/596
2016/0303939 A1 * 10/2016 Tsukamoto ........ B60G 21/0551
2018/0141402 A1 * 5/2018 Oh ............................ F16F 1/38
2022/0016952 A1 * 1/2022 Nakagaki .............. F16F 1/3873
2022/0080800 A1 * 3/2022 Lee .................... B60G 21/0551
2025/0109779 A1 * 4/2025 Kuroda ................... F16F 13/14

FOREIGN PATENT DOCUMENTS

JP 2019-214287 A 12/2019

* cited by examiner

*Primary Examiner* — Thomas W Irvin
(74) *Attorney, Agent, or Firm* — WHDA, LLP

(57) ABSTRACT

An anti-vibration device is provided to enable improvement in a static spring constant of a bush in an axially perpendicular direction while suppressing an increase in a volume of the bush. A lower seat is formed to a position downward relative to a through hole on an axial end surface of a bush. The lower seat axially outwardly inclines downward to the outer circumferential surface of the bush. This lower seat enables suppression of an increase in a volume of the bush and improvement of a static spring constant of the bush relative to downward compressive deformation.

6 Claims, 11 Drawing Sheets

ANTI-VIBRATION DEVICE

TECHNICAL FIELD

The present invention relates to an anti-vibration device and particularly to an anti-vibration device that enables improvement in a static spring constant of a bush in an axially perpendicular direction while an increase in the volume of the bush is suppressed.

BACKGROUND ART

For example, an anti-vibration device that connects an axial first component such as a stabilizer bar and a cylindrical second component such as a bracket to each other with a cylindrical bush made of an elastic body is known. The first component is inserted into a through hole provided in the center of the bush, and the bush is compressed in the axially perpendicular direction while the outer circumferential surface of the bush contacts with the second component. In the unloaded state, in the bush disclosed in Patent Literature 1, one axial end surface is formed flat, and the side of the inner circumference surface (through hole) of the other axial end surface overhangs in the axial direction.

CITATION LIST

Patent Literature

[Patent Literature 1] JP-A No. 2019-214287

SUMMARY OF INVENTION

Technical Problem

However, like in the above prior art, when the axial end surface of the bush is flat and when the bush is compressed in the axially perpendicular direction, the axial end surface is raised in the central portion between the inner circumferential surface and outer circumferential surface. This raised portion hardly influence the static spring constant of the bush, but increases the volume of the bush. Moreover, similarly, also when the side of the inner circumferential surface of the axial end surface overhangs, the portion raised axially outward of the contact surface between the outer circumferential surface and the second component hardly influences the static spring constant, and increases the volume of the bush.

The present invention is to solve the above problem and has an object to provide an anti-vibration device capable of improving a static spring constant of a bush in the axially perpendicular direction while suppressing an increase in the volume of the bush.

Solution to Problem

To achieve the object, the anti-vibration device of the present invention includes an elastic body compressed in the axially perpendicular direction between the outer circumferential surface of an axial first component and the inner circumferential surface of a cylindrical second component, and includes a bush formed in a cylindrical shape surrounding the axis. The above bush includes a through hole into which the first component is insertable to form the inner circumference surface of the bush and a first seat formed in a position in a first direction of the axially perpendicular directions relative to the through hole on at least one axial end surface of the bush. The first seat inclines axially outwardly toward the first direction up to the outer circumferential surface of the bush, the outer circumferential surface being contactable with the second component.

Advantageous Effects of Invention

According to the anti-vibration device of the first aspect, the first seat is formed in the position in the first direction relative to the through hole on at least one axial end surface of the bush. The first seat inclines axially outwardly toward the first direction up to the outer circumferential surface of the bush, the outer circumferential surface being contactable with the second component. With this first seat, the center portion between the inner circumferential surface and the outer circumferential surface of one axial end surface of the bush less expands, and the contact area between the outer circumferential surface of the bush and the second component can be made large. As a result, the static spring constant of the bush relative to the compressive deformation in the first direction can be improved while the increase in the volume of the bush is suppressed.

According to the anti-vibration device of the second aspect, the following advantageous effect is achieved in addition to the advantageous effect by the anti-vibration device of the first aspect. The first seat is formed to each of the axial opposite end surfaces of the bush. This allows the static spring constant of the bush in the first direction to be further improved while the increase in the volume of the bush is suppressed.

According to the anti-vibration device of the third aspect, the following advantageous effect is achieved in addition to the advantageous effect by the anti-vibration device of the first aspect. On at least one axial end surface of the bush, the second seat is formed in the position in the second direction opposite to the first direction relative to the through hole. The second seat inclines axially outwardly toward the second direction up to the outer circumferential surface of the bush, the outer circumferential surface being contactable with the second component. As well as the first seat, this second seat allows the static spring constant of the bush relative to the compressive deformation in the second direction to be improved while the increase in the volume of the bush is suppressed.

According to the anti-vibration device of the fourth aspect, the following advantageous effect is achieved in addition to the advantageous effect by the anti-vibration device of the first aspect. Across the entire length in the third direction perpendicular to the axial direction and the first direction, the first seat is formed to the axial end surface of the bush. For example, this may allow the bush to less slide axially relative to the second component across the entire length in the third direction when the bush is compressed and deformed in the first direction in the case where the outer circumferential surface of the bush is in non-contact with the inner circumferential surface of the second component. This enables reduction, e.g., in change of the static spring constant of the bush resulting from the slide.

According to the anti-vibration device of the fifth aspect, the following advantageous effect is achieved in addition to the advantageous effect by the anti-vibration device of the first aspect. The first seat has a cross section that is the same across the entire length in the third direction perpendicular to the axial direction and the first direction. This allows the bush to be easily formed using a mold with parting in the third direction.

According to the anti-vibration device of the sixth aspect, the following advantageous effect is achieved in addition to the advantageous effect by the anti-vibration device of the first aspect. The axial end surface of the bush includes a flat surface perpendicular to the axis of the bush. The boundary between this flat surface and first seat is a straight line perpendicular to the first direction when axially viewed, and is a tangent of the inner circumferential edge of the through hole. Thus, the first seat can be provided from the portion that easily contributes to improvement in the static spring constant of the bush in the first direction, and the portion for less contribution can be a flat surface. As a result, the balance of reduction in the volume of the bush and improvement in the static spring constant of the bush in the first direction can be improved.

According to the anti-vibration device of the seventh aspect, the following advantageous effect is achieved in addition to the advantageous effect by the anti-vibration device of the first aspect. The anti-vibration device includes the second component in contact with the outer circumferential surface of the bush. Since the outer circumferential surface of the bush does not adhere to the second component, the bush may axially slide while the bush compressed and deformed in the axially perpendicular direction expands to axially escape. However, the bush can be made to less slide in the axial direction relative to the second component by the inclination of the first seat that spreads toward the second component, even when the bush is compressed and deformed in the first direction. This enables reduction, e.g., in change of the static spring constant of the bush resulting from the slide.

DESCRIPTION OF EMBODIMENTS

Figure 1:
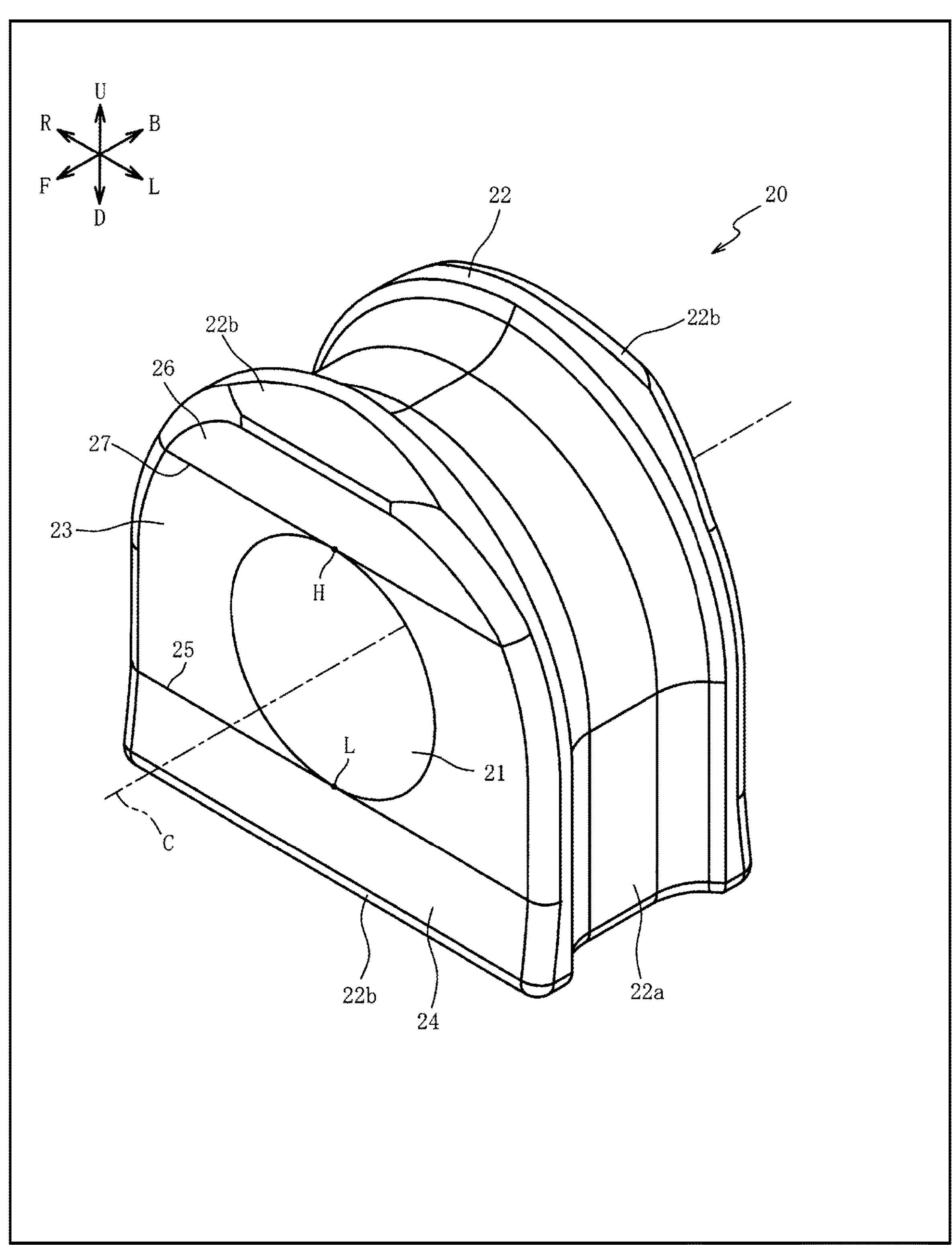
FIG. 1 is a perspective view of a bush of an anti-vibration device in the first embodiment.
Figure 2:
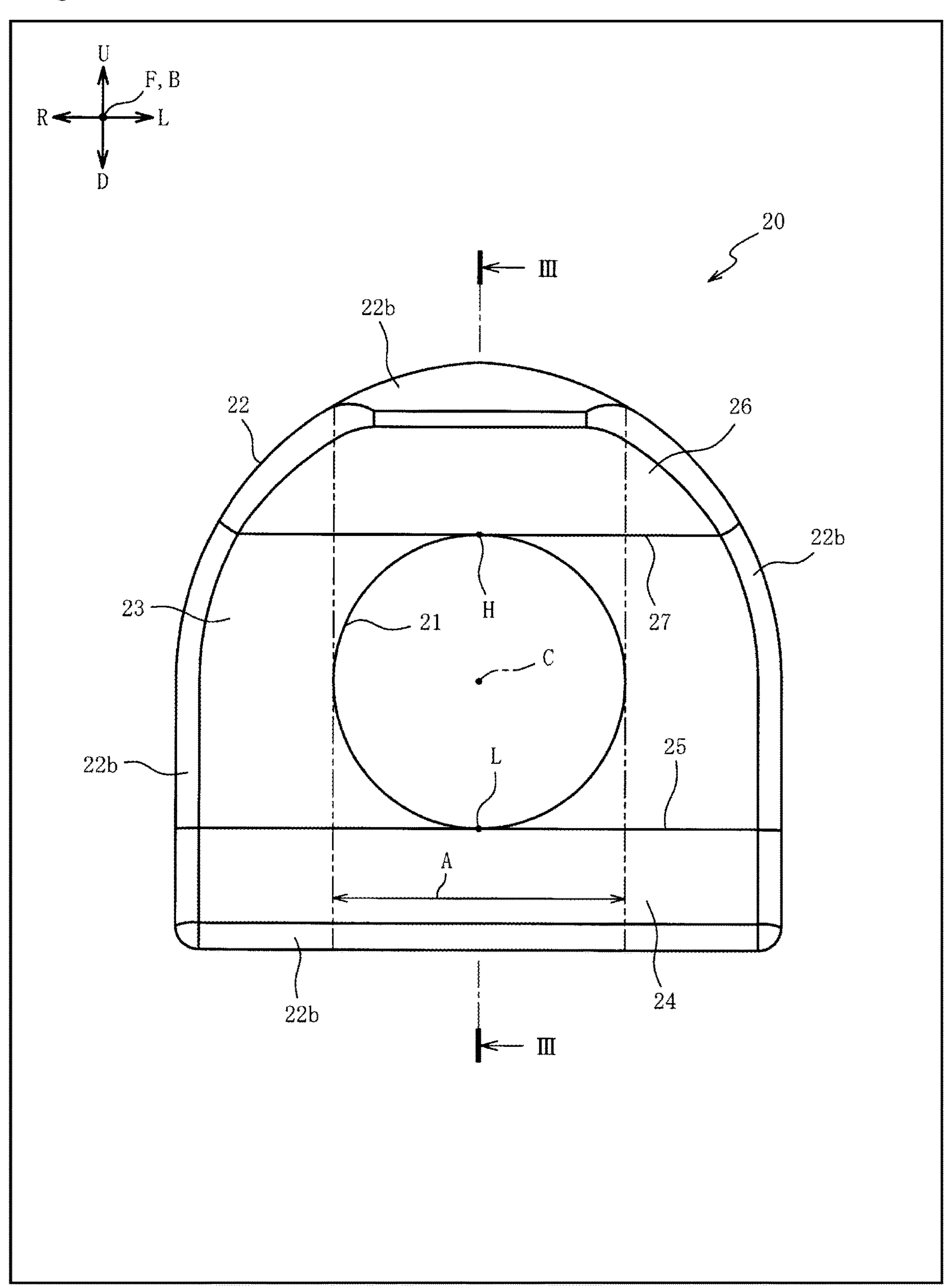
FIG. 2 is a front view of the bush.
Figure 3:
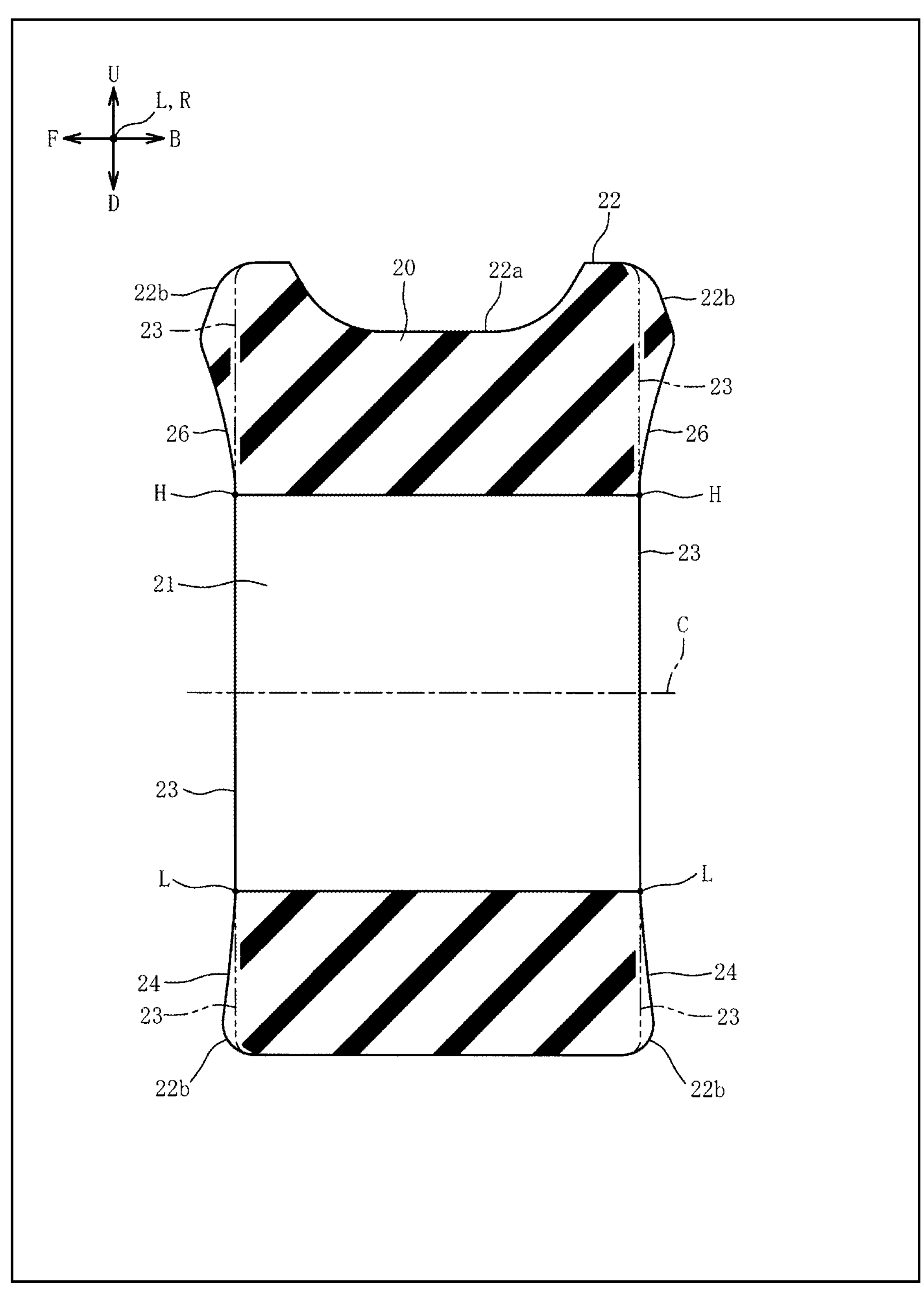
FIG. 3 is a cross section of the bush along line III-III of FIG. 2.

Hereinafter, preferable embodiments are explained with reference to the accompanying drawings. FIG. 1 is a perspective view of a bush 20 of an anti-vibration device 10 (refer to FIG. 4) in the first embodiment. FIG. 2 is a front view of the bush 20. FIG. 3 is a cross section of the bush 20 along line III-III of FIG. 2.

An arrow U, arrow D, arrow L, arrow R, arrow F, and arrow B in each figure show an upward direction, downward direction, leftward direction, rightward direction, frontward direction, and backward direction of the bush 20, respectively. The up-down direction, left-right direction, and front-back direction are perpendicular to each other. Moreover, the bush 20 of FIGS. 1 to 3 is in an unloaded state where any load other than the gravity is not applied. The bush 20 in the unloaded state is explained using FIGS. 1 to 3 unless otherwise specified.

As shown in FIG. 1 and FIG. 2, the bush 20 is a cylindrical component surrounding an axis C, and includes an elastic body such as rubber and thermoplastic elastomer. In the present specification, a direction parallel to the axis C is called just an axial direction, and a direction perpendicular to the axis C is called an axially perpendicular direction. It is noted that the front-back direction and axial direction of the bush 20 are the same as each other, and the up-down direction and left-right direction of the bush 20 are ones of the axially perpendicular directions.

A through hole 21 that forms the inner circumferential surface of the bush 20 penetrates through the bush 20 in the axial direction. The through hole 21 has a circular shape about the axis C when viewed in the axial direction (FIG. 2). The radius from the axis C to the inner circumferential surface of the through hole 21 is generally the same across the entire circumference.

When viewed in the axial direction, an outer circumferential surface 22 of the bush 20 is formed to have an upper half shaped in an arc about the axis C and a lower half shaped in a rectangle. In other words, the outer circumferential surface 22 is formed in the shape of an inverted U when viewed in the axial direction. Additionally, on the generally entire circumference of the circumferential surface 22 other than the bottom surface, a recessed surface 22*a* is formed to have an axial center portion recessed inward in the axially perpendicular direction.

Further, an axial end portion of the outer circumferential surface 22 is formed of a curved surface 22*b* smoothly connected with an axial end surface of the bush 20. That is, the curved surface 22*b* is inclined toward the center in the axial direction with distance from the axial end surface of the bush 20 in the axially perpendicular direction.

As shown in FIG. 1 and FIG. 3, the axial end surface of the bush 20 is formed of a flat surface 23 perpendicular to the axis C and a lower seat (first seat) 24 and an upper seat (second seat) 26 that incline outward in the axial direction with distance from the through hole 21. In the bush 20 in the present embodiment, the opposite end surfaces in the axial direction are formed identically to each other.

The flat surface 23 is provided to the opposite sides in the left-right direction relative to the through hole 21. The lower seat 24 is provided on a position in the downward direction (first direction) relative to the through hole 21. The upper seat 26 is provided on a position in the upward direction (second direction) relative to the through hole 21. It is noted that FIG. 3 shows, as the two-dot chain lines, the case where the flat surface 23 extends to the opposite sides in the up-down direction relative to the through hole 21.

The lower seat 24 axially outwardly inclines downward to the curved surface 22*b* of the outer circumferential surface 22 of the bush 20. The upper seat 26 axially outwardly inclines upward to the curved surface 22*b*. The inclination angle of the upper seat 26 to the flat surface 23 is larger than that of the lower seat 24 to the flat surface 23. This makes part of the upper seat 26 overhangs outwardly in the axial direction relative to the lower seat 24.

As shown in FIG. 2, a boundary 25 between the flat surface 23 and the lower seat 24 is a straight line perpendicular to the up-down direction when axially viewed, and is a tangent with the inner circumferential edge of the through hole 21. The boundary 27 between the flat surface 23 and the upper seat 26 is a straight line perpendicular to the up-down direction when axially viewed, and is a tangent with the inner circumferential edge of the through hole 21. That is, when axially viewed, the tangent at a lowest point L on the inner circumferential edge of the through hole 21 is the boundary 25, and the tangent at a highest point H on the inner circumferential edge of the through hole 21 is the boundary 27. Additionally, the boundary 25 is a starting point of the inclination of the lower seat 24, and the boundary 27 is a starting point of the inclination of the upper seat 26.

The lower seat 24 and the upper seat 26 are formed across the entire length in the left-right direction (third direction) in the axial end surface of the bush 20. Further, the lower seat 24 and the upper seat 26 have sectional shapes perpendicular to the left-right direction, the sectional shapes being the same across the entire length in the left-right direction. This allows the bush 20 to be easily molded using a mold with parting in the center in the left-right direction.

Figure 4:
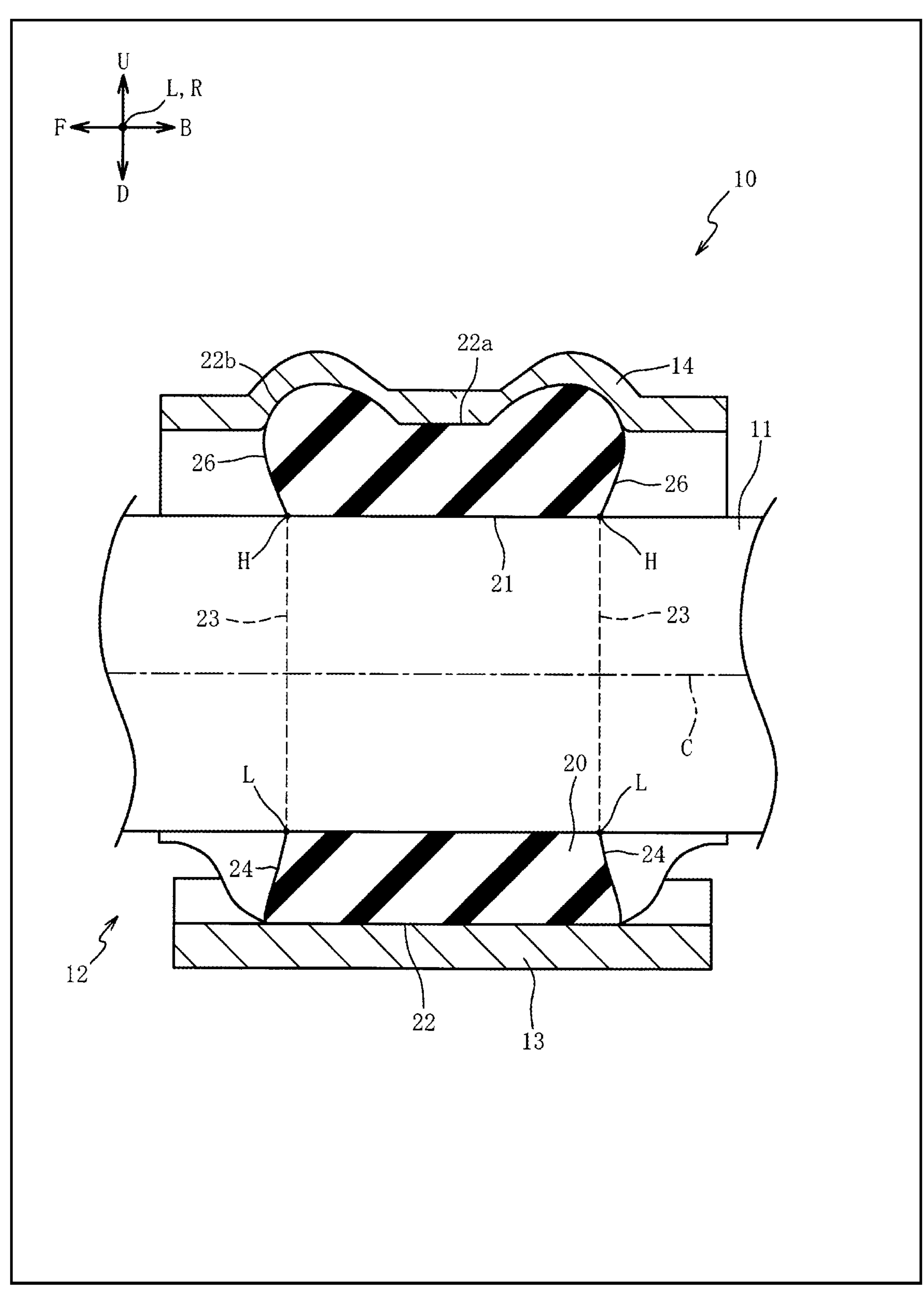
FIG. 4 is a cross section of the anti-vibration device in which the bush is assembled to a stabilizer bar and a bracket.

Next, use of the anti-vibration device 10 including the bush 20 is explained with reference to FIG. 4. FIG. 4 is a cross section of the anti-vibration device 10 in which the bush 20 is assembled to the stabilizer bar 11 and the bracket 12. It is noted that, in the present embodiment, the up-down direction, left-right direction, and front-back direction of the bush 20 are coincident with the up-down direction, left-right direction, and front-back direction of a vehicle that mounts the bush 20, respectively. However, the directions of the bush 20 may be different from those of the vehicle.

The stabilizer bar 11 is a component for suppressing rolling of a vehicle body, and is disposed along the left-right direction of a vehicle. The stabilizer bar 11 is an axial steel material having a circular cross section. The stabilizer bar 11 is inserted and fits in the through hole 21 of the bush 20, and the outer circumferential surface of the stabilizer bar 11 and the inner circumferential surface of the bush 20 (through hole 21) are in intimate contact with each other.

The anti-vibration device 10 elastically supports the stabilizer bar 11 on the vehicle body, and includes the bracket 12 and the bush 20. The bracket 12 is a cylindrical component for assembling the bush 20 to the vehicle body while compressing the bush 20, into which the stabilizer bar 11 is inserted, in the axially perpendicular direction.

The bracket 12 includes a flat plate component 13 that contacts the bottom surface of the outer circumferential surfaces 22 of the bush 20 without adhesion and a curved plate component 14 that contacts the upper surface and both the left and right surfaces of the outer circumferential surface 22 without adhesion. When viewed in the front-back direction, the curved plate component 14 is formed in the shape of an inverse U like the outer circumferential surface 22 of the bush 20. Additionally, the inner circumferential surface of the curved plate component 14 is formed to match the shapes of the recessed surface **22*a* and the curved surface 22*b* in the outer circumferential surface 22 of the bush 20 to be in intimate contact with the recessed surface 22*a* and curved surface 22*b***.

When inserted into the inside of the curved plate component 14, the bush 20 is compressed in the left-right direction. Further, when the bush 20 is pinched between the flat plate component 13 and the curved plate component 14 in the up-down direction and when the flat plate component 13 and the curved plate component 14 are engaged with each other by an engagement component (not shown), the bush 20 is compressed in the up-down direction. It is noted that the bracket 12 (the flat plate component 13 and the curved plate component 14) is engaged also with the vehicle body by this engagement component.

Thus, the state where the bush 20 is assembled to the stabilizer bar 11 and the bracket 12 is called an assembled state of the bush 20. In this assembled state, the bush 20 is compressed mainly above and below the stabilizer bar 11, and this compressed portion expands in the axial direction compared to the unloaded state. Particularly, a center portion in the axially perpendicular direction, the portion being away from the stabilizer bar 11 and the bracket 12, tends to rise on the axial end surface of the bush 20.

Due to the expansion of the bush 20, the portion raised axially outward from the contact surface between the bush 20 and bracket 12 in the cross section including the axis C increases the volume of the bush 20 with rarely affecting the static spring constant of the bush 20. It is noted that the compressive deformation of the bush 20 means that the bush 20 compressed by being assembled to the stabilizer bar 11 and bracket 12 is further compressed in the axially perpendicular direction by the input of vibration to the anti-vibration device 10.

The lower seat 24 and the upper seat 26 are formed to the axial end surface of the bush 20 in the present embodiment above and below the stabilizer bar 11 (through hole 21) to axially expand by the up-down compression. In the unloaded state (the state e.g., in FIG. 3), the lower seat 24 and the upper seat 26 are axially outwardly inclined up to the curved surface **22*b* of the outer circumferential surface 22 in contact with the bracket 12 with distance from the stabilizer bar 11 (through hole 21**) in the up-down direction, respectively.

With the lower seat 24 and upper seat 26, above and below the stabilizer bar 11, the center portion on the axial end surface of the bush 20 can be made to be less raised, and the contact area between the bush 20 and bracket 12 can be large. As a result, the static spring constant of the bush 20 relative to the compressive deformation in the up-down direction can be improved while the increase in the volume of the bush 20 is suppressed.

For example, to inhibit the bush 20 from contacting with a component near the bracket 12, the bush 20 may be required not to axially overhang from the bracket 12 even when the bush 20 is compressed and deformed to the maximum in the up-down direction. To attain such requirement, even when it is difficult to increase the volume of the bush 20 the static spring constant of the bush 20 in the up-down direction is improvable by the lower seat 24 and the upper seat 26.

The lower seat 24 and the upper seat 26 are formed to each of the axial opposite end surfaces of the bush 20. Therefore, compared with the case where the lower seat 24 and the upper seat 26 are formed only to one axial end surface, the static spring constant of the bush 20 in the up-down direction is more improvable.

Additionally, the outer circumferential surface 22 of the bush 20 and the inner circumferential surface of the bracket 12 are not adhered to each other. Therefore, the bush 20 compressed and deformed in the axially perpendicular direction may axially slide relative to the bracket 12 while expanding to axially escape.

However, the bush 20 in the present embodiment can receive the load in the up-down direction from the stabilizer bar 11 by using the lower seat 24 and the upper seat 26 that spread toward the contact surfaces with the bracket 12. Therefore, the bush 20 can be made to less slide in the axial direction relative to the bracket 12 when the bush 20 is compressed and deformed in the up-down direction. This enables reduction, e.g., in change of the static spring constant of the bush 20 resulting from the slide.

It is noted that, to improve the static spring constant of the bush 20 in the up-down direction, the lower seat 24 and the upper seat 26 within an area A overlapping with the through hole 21 when viewed in the up-down direction are easily contributable and the lower seat 24 and the upper seat 26 outside the area A are not contributable. The end edges of the area A in the left-right direction are shown in FIG. 2 by the two-dot chain lines.

However, the lower seat 24 and the upper seat 26 outside the area A can exert the advantageous effect of making the bush 20 less slidable in the axial direction relative to the bracket 12. Therefore, by providing the lower seat 24 and the upper seat 26 not only inside the area A but outside the area A, the range where the bush 20 less slides in the axial direction relative to the bracket 12 can be made large when the bush 20 is compressed and deformed in the up-down direction.

Further, the lower seat 24 and the upper seat 26 are formed across the entire left-right length in the axial end surface of the bush 20. Therefore, the bush 20 can be made to less axially slide across the entire left-right length relative to the bracket 12 when the bush 20 is compressed and deformed in the up-down direction. Further, this enables reduction, e.g., in change of the static spring constant of the bush 20 resulting from the slide.

In the bush 20, the shape of the portion just below the lowest point L and the shape of the portion just above the highest point H most easily contribute to the static spring constant of the bush 20 in the up-down direction. Since the lower seat 24 is formed downward from the lowest point L and the upper seat 26 is formed upward from the highest point H, the static spring constant of the bush 20 in the up-down direction can be further improved.

Additionally, the bush 20 between the tangent (boundary 25) on the lowest point L and the tangent (boundary 27) on the highest point H easily moves together with the stabilizer bar 11 on vibration in the up-down direction. Therefore, the shape of the bush 20 between the tangents less contributes to the static spring constant of the bush 20 in the up-down direction.

On the other hand, the shapes of the bush 20 above and below the tangents (boundaries 25 and 27) easily contribute to the static spring constant of the bush 20 in the up-down direction. In the present embodiment, the inclinations of the lower seat 24 and the upper seat 26 begin from the boundaries 25 and 27, respectively. That is, the lower seat 24 and the upper seat 26 are provided from the portions that easily contribute to improvement in the static spring constant of the bush 20 in the up-down direction, and the portion with less contribution can be used as the flat surface 23. As a result, the balance of reduction in the volume of the bush 20 and improvement in the static spring constant of the bush 20 in the up-down direction can be improved.

Below the stabilizer bar 11, the bush 20 compressed in the up-down direction between the stabilizer bar 11 and bracket 12 expands along the upper surface of the planar flat plate component 13 primarily in the axial direction. On the other hand, above the stabilizer bar 11, the bush 20 compressed in the up-down direction between the stabilizer bar 11 and the bracket 12 not only axially expands but expands in the axially perpendicular direction etc. to be in intimate contact with the uneven shape of the inner circumferential surface of the curved plate component 14.

Therefore, change of the bush 20 in the amount of overhang from the flat surface 23 in the axial direction when the bush 20 enters the assembled state from the unloaded state becomes larger on the lower seat 24 on the lower side than on the upper seat 26 on the upper side. However, in the unloaded state, the amount of the maximum overhang from the flat surface 23 in the axial direction is beforehand made larger at a part of the upper seat 26 than at the lower seat 24. Therefore, in the assembled state, the amount of the maximum overhang can be close to the same between the lower seat 24 and the upper seat 26. As a result, the downward static spring constant and upward static spring constant of the bush 20 are made close to each other, and the static spring constant in the up-down direction can be well balanced.

Figure 5A:
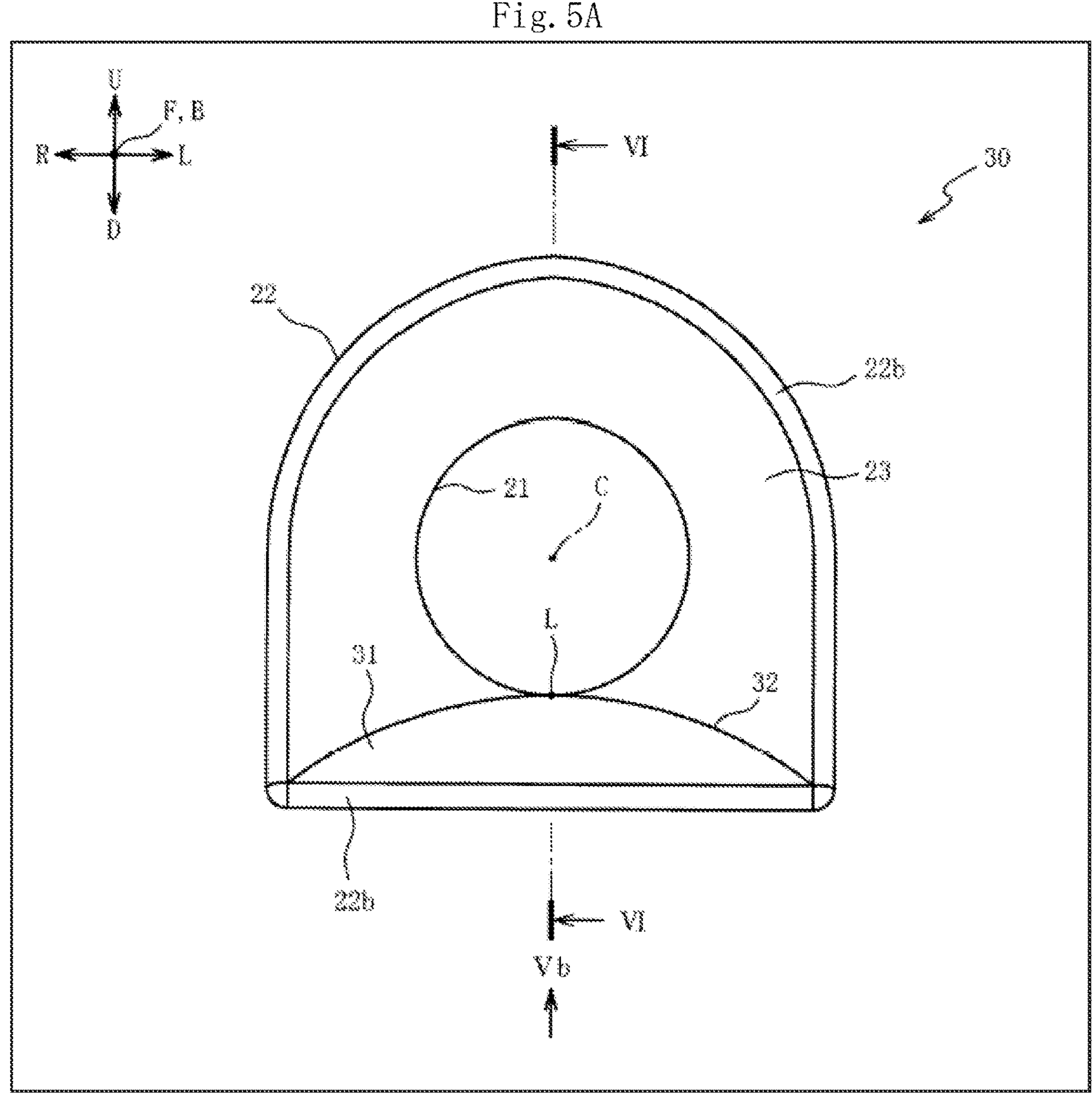
FIG. 5A is a front view of the bush of the anti-vibration device in the second embodiment.
Figure 5B:
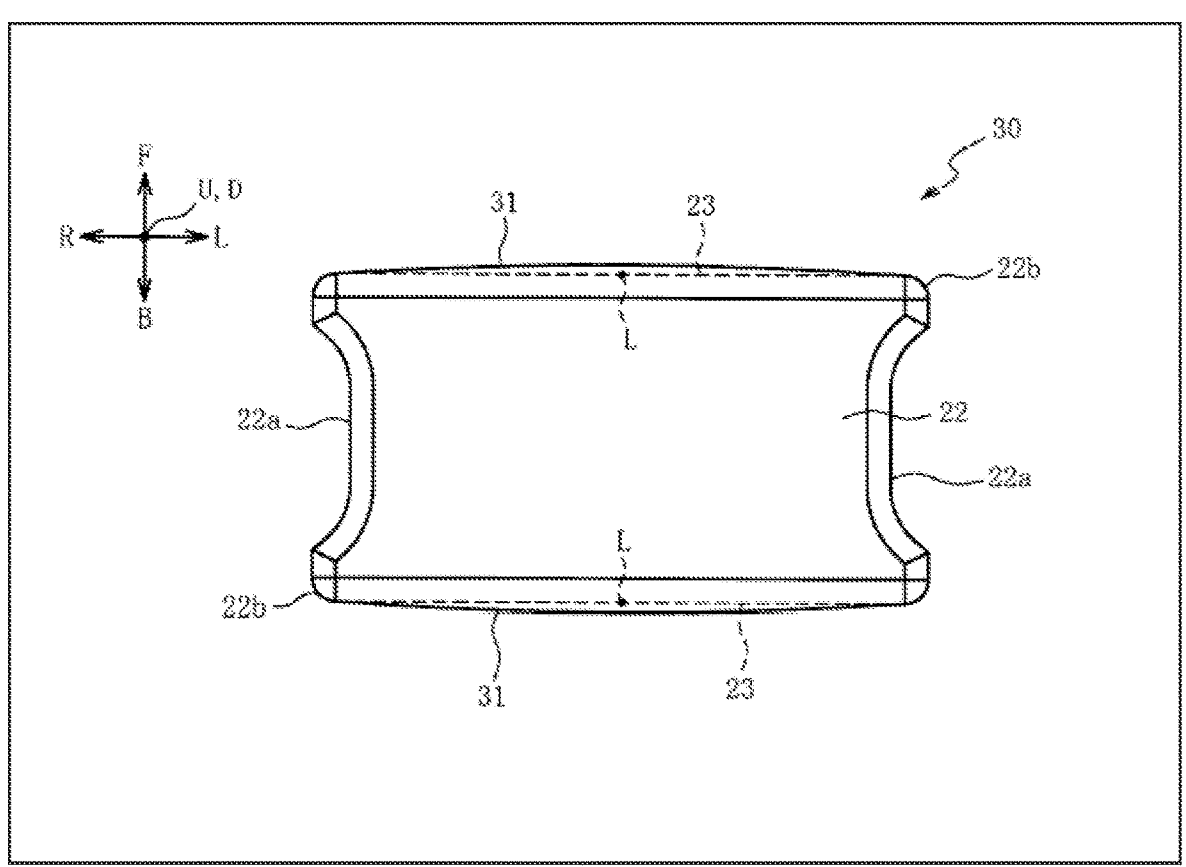
FIG. 5B is a bottom view of the bush viewed from arrow Vb of FIG. 5A.
Figure 6:
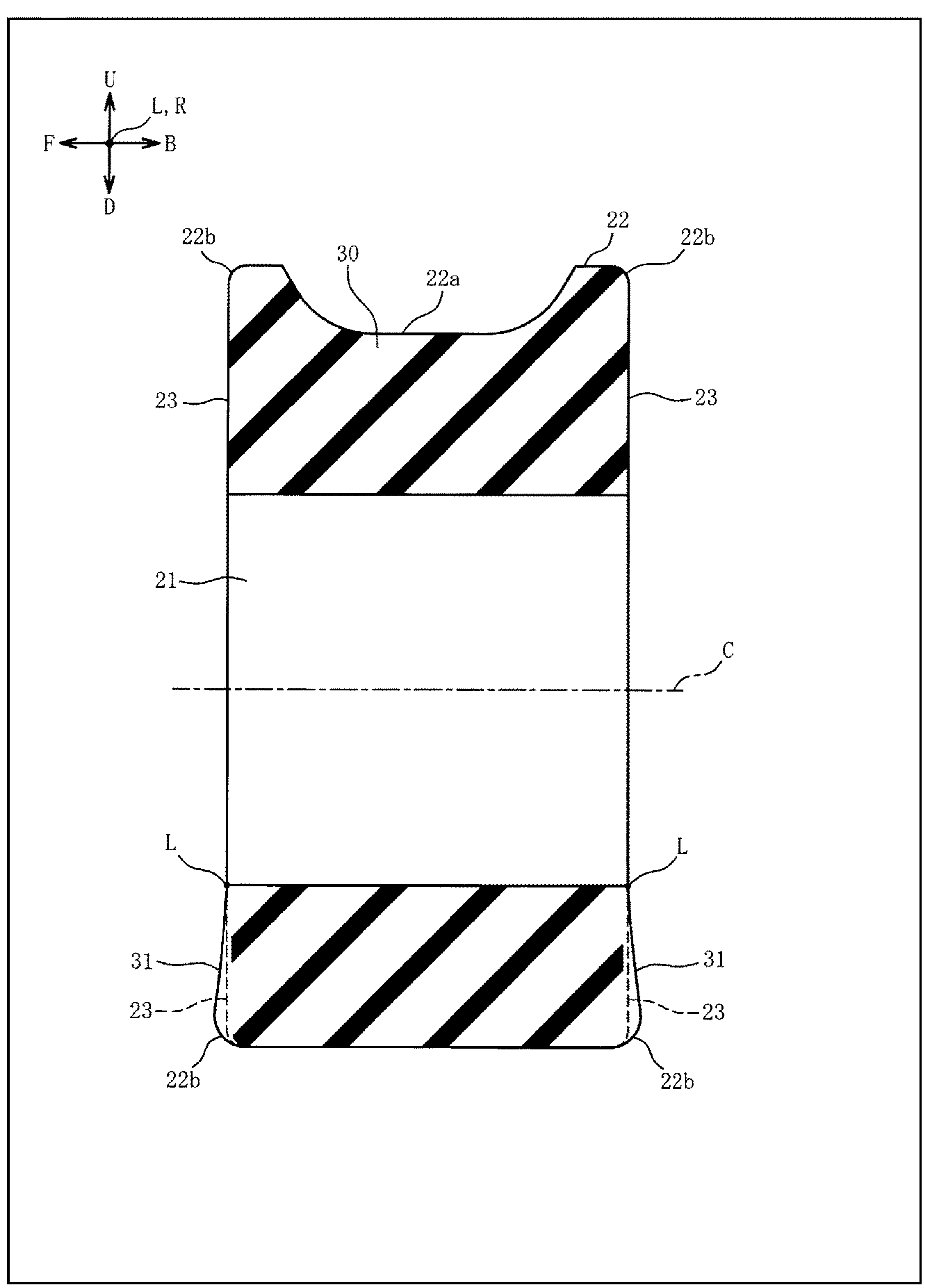
FIG. 6 is a cross section of the bush along line VI-VI of FIG. 5A.

Next, with reference to FIG. 5A to FIG. 6, the second embodiment is described. The first embodiment has explained the bush 20 having the lower seat 24 and the upper seat 26. On the other hand, the second embodiment explains a bush 30 having a lower seat 31 but not having the upper seat 26. It is noted that the same portions as in the first embodiment have the same reference signs, and are not explained.

FIG. 5A is a front view of the bush 30 of the anti-vibration device in the second embodiment. FIG. 5B is a bottom view of the bush 30 viewed from arrow Vb of FIG. 5A. FIG. 6 is a cross section of the bush 30 along line VI-VI of FIG. 5A.

The bush 30 is a component made of an elastic body assembled to the stabilizer bar 11 and the bracket 12 (refer to FIG. 4). The bush 30 is cylindrically shaped to surround the axis C. The bush 30 includes the through hole 21 into which the stabilizer bar 11 can be inserted and the outer circumferential surface 22 with which the bracket 12 can be in (intimate) contact.

The axial end surface of the bush 30 is formed of the flat surface 23 perpendicular to the axis C and the lower seat (the first seat) 31 that inclines axially outward with distance from the through hole 21. The axially opposite end surfaces of the bush 30 in the present embodiment are formed identically to each other.

The flat surface 23 is provided to left-right opposite sides of and above the through hole 21. That is, the portion where the upper seat 26 is formed in the first embodiment is the flat surface 23 in the second embodiment.

The lower seat 31 is provided on a position in the downward direction (first direction) relative to the through hole 21. The lower seat 31 axially outwardly inclines downward to the curved surface 22*b* of the outer circumferential surface 22 of the bush 30. Thus, like in the first embodiment, with the lower seat 31, while the increase in the volume of the bush 30 is suppressed, the static spring constant of the bush 30 relative to downward compressive deformation can be improved. Further, with the lower seat 31, the bush 30 can be made to less slide axially relative to the bracket 12 when the bush 30 is compressed and deformed downward.

When axially viewed, a boundary 32 between the flat surface 23 and the lower seat 31 has a top that is the lowest point L on the inner circumferential edge of the through hole 21 and has an arc shape curved downward away from the top in the left-right direction. More specifically, the boundary 32 is formed as an arc passing through the lowest point L and the bottom right corner and bottom left corner on the axial end surface of the bush 30.

The portion just below the lowest point L in the shape of the bush 30 most easily contributes to the downward static spring constant of the bush 30, and the portion with distance from the lowest point L in the left-right direction less contributes to the downward static spring constant of the bush 30. With the arc shaped boundary 32 having the lowest point L as the top, the lower seat 31 is provided to the generally entire portion that most easily contributes to improvement in the downward static spring constant of the bush 30, and the ratio of the flat surface 23 can be increased as the contribution decreases. As a result, the balance of reduction in the volume of the bush 30 and improvement in the static spring constant of the bush 30 in the downward direction can be improved.

In the bottom view shown in FIG. 5B, the lower seat 31 curves from the left-right opposite ends toward the center (just below the lowest point L) to gradually increase the amount of axial overhang from the flat surface 23. Therefore, the lower seat 31 has the large amount of axial overhang in the portion that most easily contributes to improvement in the downward static spring constant of the bush 30, and as the contribution decreases, the amount of axial overhang becomes small.

Therefore, the balance between reduction in the volume of the bush 30 and improvement in the downward static spring constant of the bush 30 can be further improved.

Figure 7:
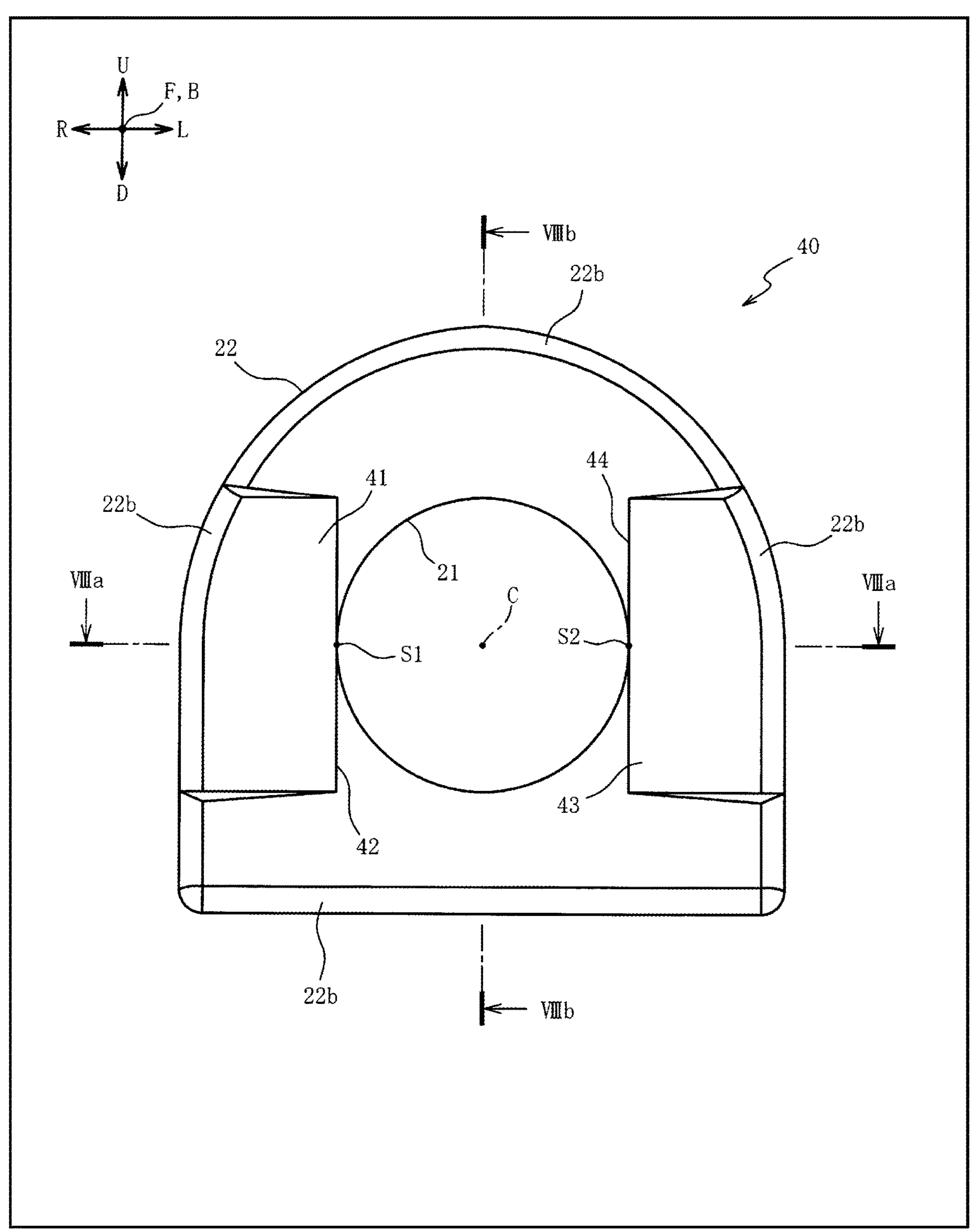
FIG. 7 is a front view of the bush of the anti-vibration device in the third embodiment.
Figure 8A:
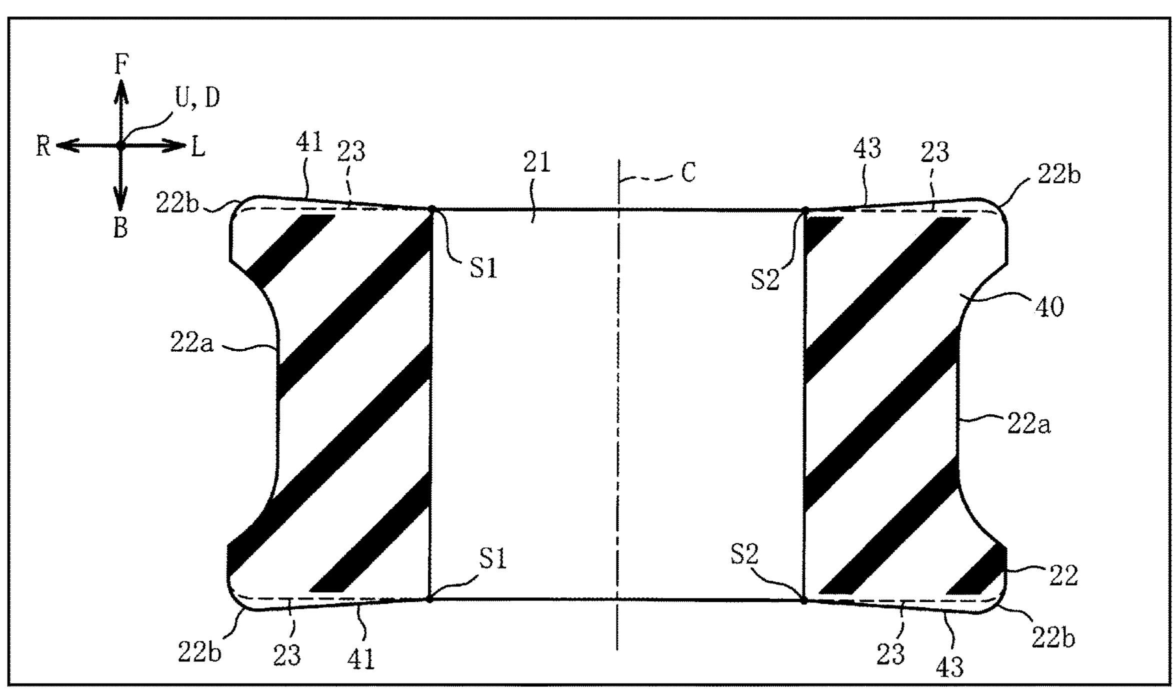
FIG. 8A is a cross section of the bush along line VIIIa-VIIIa of FIG. 7.
Figure 8B:
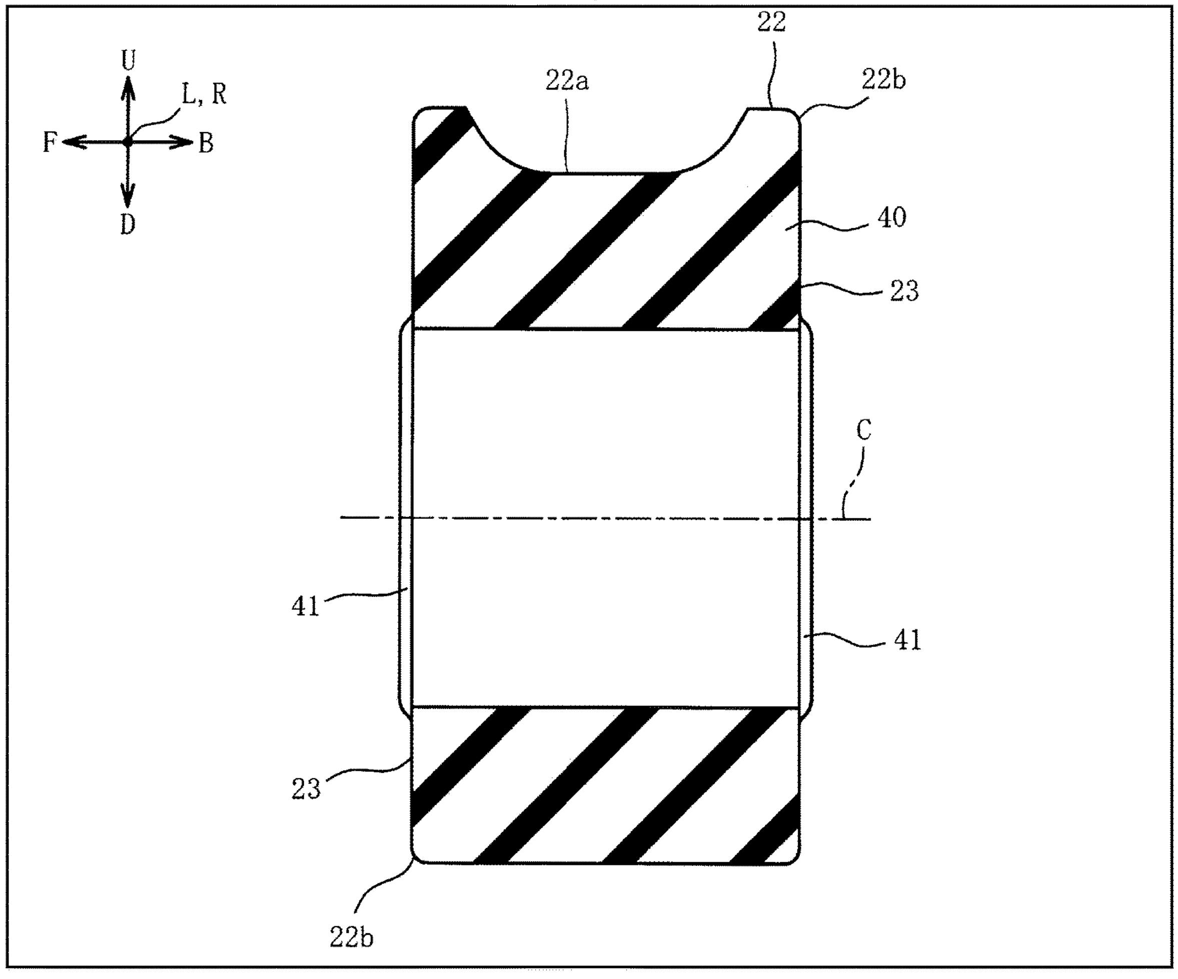
FIG. 8B is a cross section of the bush along line VIIIb-VIIIb of FIG. 7.

Next, with reference to FIG. 7 to FIG. 8B, the third embodiment is described. The first embodiment has explained the bush 20 having the lower seat 24 and the upper seat 26. On the other hand, the third embodiment explains a bush 40 in which a right seat 41 and a left seat 43 are respectively formed to the left-right opposite sides instead of the lower seat 24 and the upper seat 26. It is noted that the same portions as in the first embodiment have the same reference signs, and are not explained.

FIG. 7 is a front view of the bush 40 of the anti-vibration device in the third embodiment. FIG. 8A is a cross section of the bush 40 along line VIIIa-VIIIa of FIG. 7. FIG. 8B is a cross section of the bush 40 along line VIIIb-VIIIb of FIG. 7.

The bush 40 is a component made of an elastic body assembled to the stabilizer bar 11 and the bracket 12 (refer to FIG. 4). The bush 40 is cylindrically shaped to surround the axis C. The bush 40 includes the through hole 21 into which the stabilizer bar 11 can be inserted and the outer circumferential surface 22 with which the bracket 12 can be in (intimate) contact.

The axial end surface of the bush 40 is formed of the flat surface 23 perpendicular to the axis C and the right seat (first seat) 41 and left seat (second seat) 43 that incline axially outward away from the through hole 21. The axial opposite end surfaces of the bush 40 in the present embodiment are formed identically to each other. The flat surface 23 is provided to the opposite sides in the up-down direction relative to the through hole 21.

The right seat 41 is provided on a position in the rightward direction (first direction) relative to the through hole 21. The right seat 41 axially outwardly inclines rightward to the curved surface 22*b* of the outer circumferential surface 22 of the bush 40.

The left seat 43 is provided on a position in the leftward direction (second direction) relative to the through hole 21. The left seat 43 axially outwardly inclines leftward to the curved surface 22*b* of the outer circumferential surface 22 of the bush 40.

With the right seat 41 and the left seat 43, the bush 40 assembled to the stabilizer bar 11 and the bracket 12 (refer to FIG. 4) achieves the same advantageous effect as in the first embodiment. Specifically, with the right seat 41 and the left seat 43, the center portion in the axial end surface of the bush 40 can be less raised leftward and rightward of the stabilizer bar 11 (through hole 21) on compressive deformation in the left-right direction. Further, with the right seat 41 and the left seat 43, the contact area between the bush 40 and the bracket 12 can be enlarged. As a result, with the right seat 41 and the left seat 43, the static spring constant of the bush 40 relative to the compressive deformation in the left-right direction can be improved while the increase in the volume of the bush 40 is suppressed. Further, with the right seat 41 and the left seat 43, the bush 40 can be less slide in the axial direction relative to the bracket 12 when the bush 40 is compressed and deformed in the left-right direction.

It is the easiest for the shape of the bush 40 on the cross section (FIG. 8A) passing through a rightmost point S1 on the inner circumferential edge of the through hole 21, a leftmost point S2 on the inner circumferential edge of the through hole 21, and the axis C to contribute to the static spring constant of the bush 40 in the left-right direction. Since the right seat 41 and the left seat 43 are respectively formed from the rightmost point S1 and the leftmost point S2 in the left-right direction, the static spring constant of the bush 40 in the left-right direction can be further improved.

The boundary 42 between the flat surface 23 and the right seat 41 is a straight line perpendicular to the left-right direction when axially viewed, and is a tangent at the rightmost point S1 of the through hole 21. The boundary 44 between the flat surface 23 and the left seat 43 is a straight line perpendicular to the left-right direction when axially viewed, and is a tangent at the leftmost point S2 of the through hole 21. Additionally, the boundary 42 is a starting point of the inclination of the right seat 41, and the boundary 44 is a starting point of the inclination of the left seat 43.

Additionally, the bush 40 between the tangent (boundary 42) on the rightmost point S1 and the tangent (boundary 44) on the leftmost point S2 easily moves together with the stabilizer bar 11 on vibration in the left-right direction. Therefore, the shape of the bush 40 between the tangents less contributes to the static spring constant of the bush 40 in the left-right direction. On the other hand, the shapes of the bush 40 leftward and rightward the tangents (boundaries 42 and 44) easily contribute to the static spring constant of the bush 20 in the left-right direction.

Therefore, in the present embodiment, the right seat 41 and the left seat 43 are formed from the portion that easily contributes to improvement in the static spring constant of the bush 40 in the left-right direction, and the portion with less contribution is the flat surface 23. As a result, the balance of reduction in the volume of the bush 40 and improvement in the static spring constant of the bush 20 in the left-right direction can be improved.

Additionally, the right seat 41 and the left seat 43 are formed in the areas that overlap with the through hole 21 when viewed in left-right direction. The portion separated from these areas in the up-down direction (third direction) is formed of the flat surface 23. The opposite sides of the right seat 41 and the left seat 43 in the up-down direction less contribute to improvement in the static spring constant of the bush 40 in the left-right direction. Therefore, the balance between reduction in the volume of the bush 40 and improvement in the static spring constant of the bush 40 in the left-right direction can be further improved by not providing the right seat 41 and the left seat 43 across the entire length in the up-down direction.

The right seat 41 and the left seat 43 are formed to have the same cross sectional shapes perpendicular to the up-down direction across the generally entire length in the up-down direction (except for the end portions in the up-down direction). It is noted that the amount of axial overhang from the flat surface 23 gradually decreases at the end portions of the right seat 41 and the left seat 43 in the up-down direction to be smoothly connected with the flat surface 23. As a result, this allows the bush 40 to be easily molded using a mold with parting in the center in the up-down direction.

Next, with reference to FIG. 9A to FIG. 10B, the fourth embodiment is described. The first embodiment has explained the bush 20 having the lower seat 24 and the upper seat 26. On the other hand, the fourth embodiment explains a bush 50 that has a lower seat 51, an upper seat 52, a right seat 53, and a left seat 54. It is noted that the same portions as in the first and third embodiments have the same reference signs and are not explained.

Figure 9A:
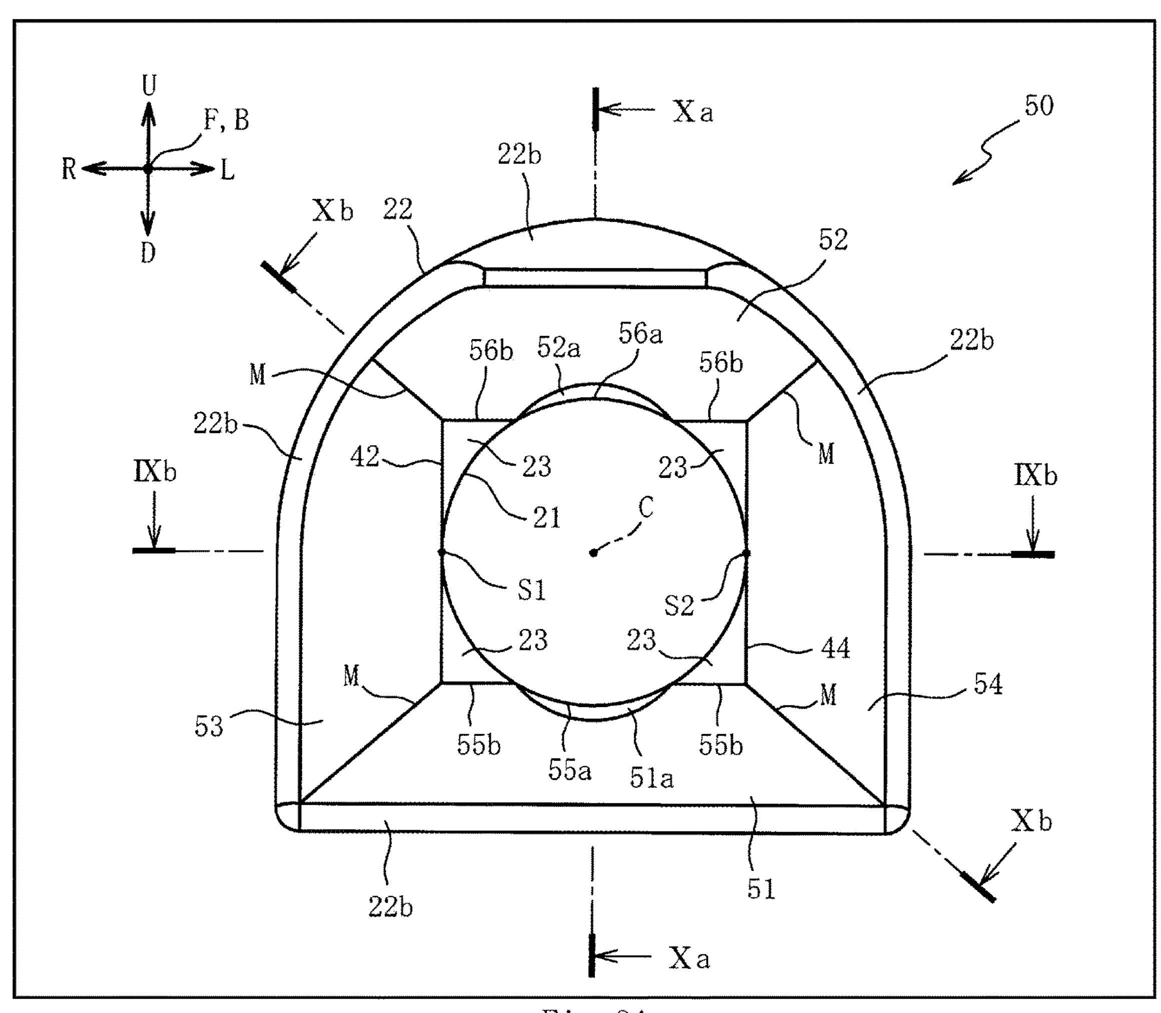
FIG. 9A is a front view of the bush of the anti-vibration device in the fourth embodiment.
Figure 9B:
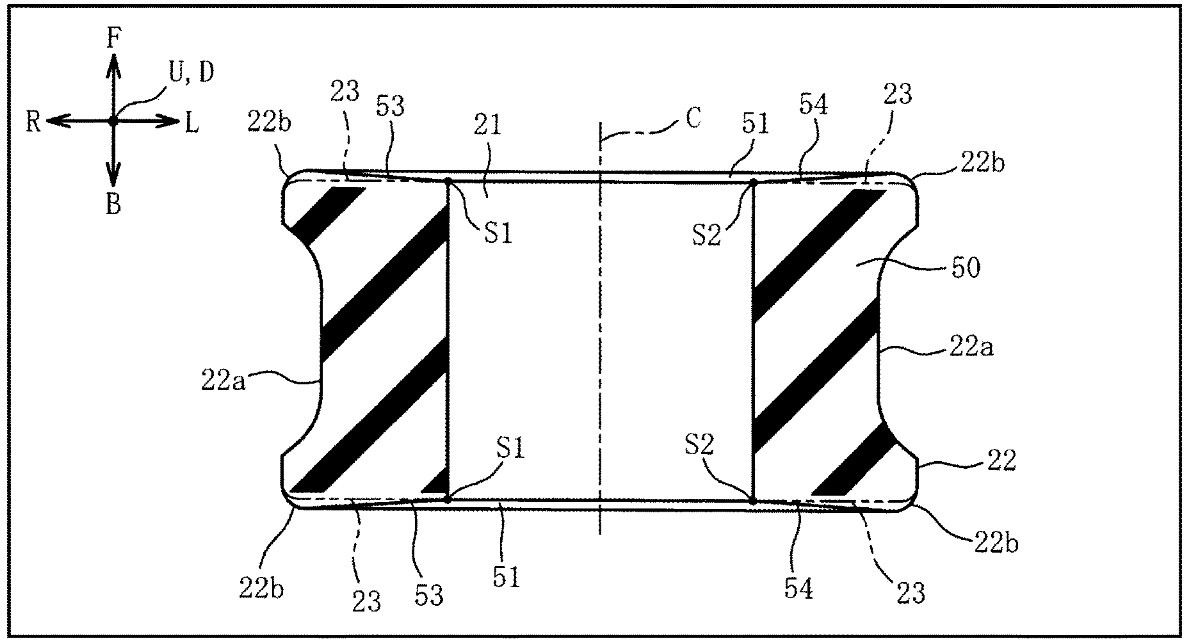
FIG. 9B is a cross section of the bush along line IXb-IXb of FIG. 9A.
Figure 10A:
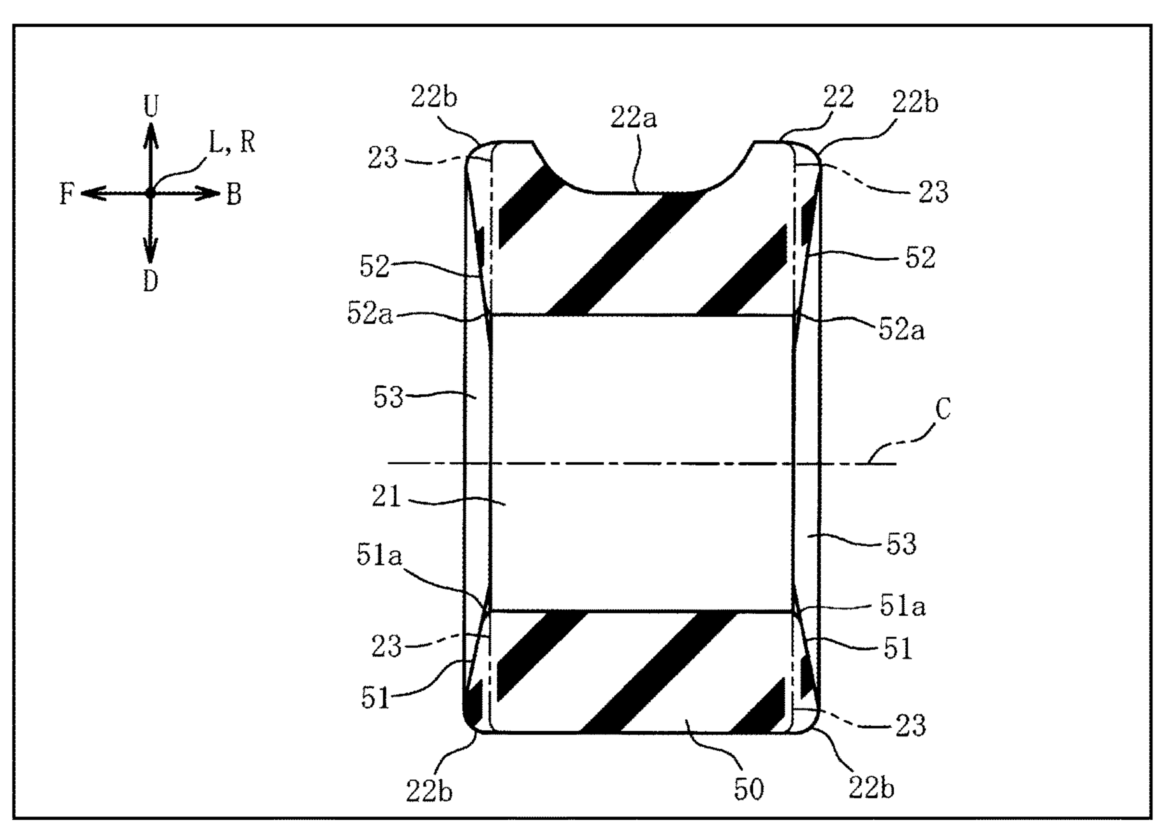
FIG. 10A is a cross section of the bush along line Xa-Xa of FIG. 9A.
Figure 10B:
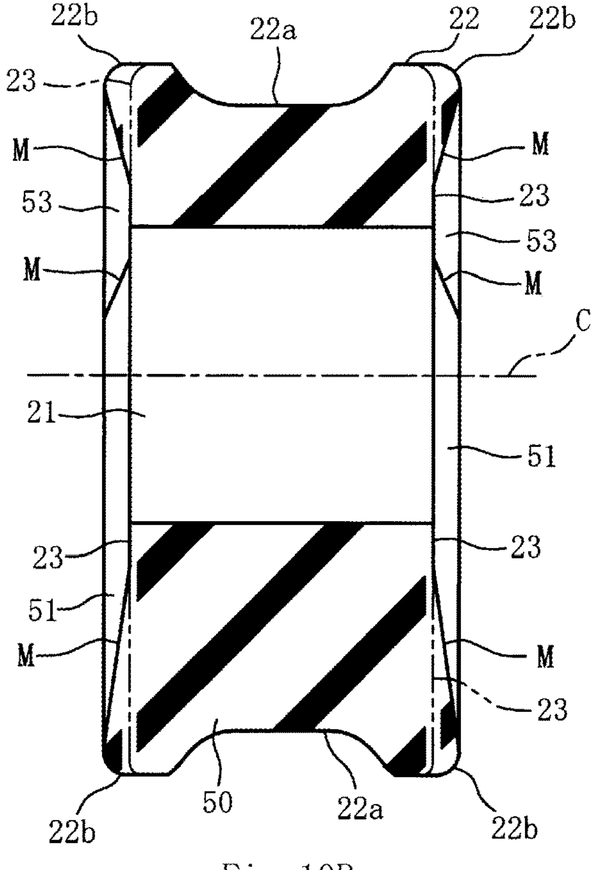
FIG. 10B is a cross section of the bush along line Xb-Xb of FIG. 9A.

FIG. 9A is a front view of the bush 50 of the anti-vibration device in the fourth embodiment. FIG. 9B is a cross section of the bush 50 along line IXb-IXb of FIG. 9A. FIG. 10A is a cross section of the bush 50 along line Xa-Xa of FIG. 9A. FIG. 10B is a cross section of the bush 50 along line Xb-Xb of FIG. 9A. It is noted that the case where the entire end surface of the bush 50 in the axial direction is the flat surface 23 is shown in FIG. 9B to FIG. 10B with the two-dot chain lines.

The bush 50 is a component made of an elastic body assembled to the stabilizer bar 11 and the bracket 12 (refer to FIG. 4). The bush 50 is cylindrically shaped to surround the axis C. The bush 50 includes the through hole 21 into which the stabilizer bar 11 can be inserted and the outer circumferential surface 22 with which the bracket 12 can be in (intimate) contact.

The axial end surface of the bush 50 is formed of the flat surface 23 perpendicular to the axis C, the lower seat (the first seat) 51, upper seat (second seat) 52, the right seat 53, and left seat 54 that incline axially outward with distance from the through hole 21. The axial opposite end surfaces of the bush 50 in the present embodiment are formed identically to each other. The flat surface 23 is provided to the upper right, the upper left, the lower right, and the lower left around the through hole 21.

The lower seat 51 is provided on a position in the downward direction (first direction) relative to the through hole 21. The lower seat 51 axially outwardly inclines downward to the curved surface 22*b* of the outer circumferential surface 22 of the bush 50. The upper seat 52 is provided on a position in the upward direction (second direction) relative to the through hole 21. The upper seat 52 axially outwardly inclines upward to the curved surface 22*b*.

The right seat 53 is provided on a position in the rightward direction (one side of the third direction) relative to the through hole 21. The right seat 53 axially outwardly inclines rightward to the curved surface 22*b*. The left seat 54 is provided on a position in the leftward direction (other side of the third direction) relative to the through hole 21. The left seat 54 axially outwardly inclines leftward to the curved surface 22*b*.

With the seats 51 to 54, the static spring constant of the bush 50 relative to the compressive deformation in the up-down direction and in the left-right direction can be improved while the increase in the volume of the bush 50 is suppressed like in the first and third embodiments. Further, with the seats 51 to 54, the bush 50 can be less slide in the axial direction relative to the bracket 12 when the bush 50 is compressed and deformed in the up-down direction or left-right direction.

The boundary 42 between the right seat 53 and the flat surface 23, the boundary 42 being the start point of inclination of the right seat 53, is a tangent at the rightmost point S1 of the through hole 21. The boundary 44 between the left seat 54 and the flat surface 23, the boundary 44 being the start point of inclination of the left seat 54, is a tangent at the leftmost point S2 of the through hole 21. Thus, reduction in the volume of the bush 50 and improvement in the static spring constant of the bush 50 in the left-right direction can be well balanced like in the third embodiment.

The starting point of inclination of the lower seat 51 is formed of a curved line 55*a* along the lower edge of the through hole 21 and straight lines 55*b* respectively extending from the opposite ends of the curved line 55*a* in the left-right direction. The starting point of inclination of the upper seat 52 is formed of a curved line 56*a* along the upper edge of the through hole 21 and straight lines 56*b* respectively extending from the opposite ends of the curved line 56*a* in the left-right direction.

Thus, the starting points of inclinations of the lower seat 51 and the upper seat 52 can be entirely close to the through hole 21 by combining the curved lines 55*a* and 56*a* and the straight lines 55*b* and 56*b*. This allows the static spring constant of the bush 50 relative to the compressive deformation in the up-down direction to be further improved.

An inclination adjustment portion 51*a* is formed to the lower seat 51 near the curved line 55*a*. The inclination adjustment portion 51*a* is a portion for easily matching the amounts of axial overhangs of the lower seat 51 below the curved line 55*a* and below the straight lines 55*b* with each other in the left-right direction while the lower edge of the through hole 21 does not overhang from the flat surface 23. Therefore, the inclination angle to the flat surface 23 is made larger at the inclination adjustment portion 51*a* than at the lower seat 51 other than the inclination adjustment portion 51*a*.

With the inclination adjustment portion 51*a*, the volume of the bush 50 can be reduced by causing the lower edge of the through hole 21 not to overhang from the flat surface 23. Further, the lower seat 51 can be easily formed by matching the amounts of axial overhangs of the lower seat 51 other than the inclination adjustment portion 51*a* in the left-right direction.

Similarly, an inclination adjustment portion 52*a* is formed to the upper seat 52 near the curved line 56*a*. The inclination angle to the flat surface 23 is made larger at the inclination adjustment portion 52*a* than at the upper seat 52 other than the inclination adjustment portion 52*a*. With the inclination adjustment portion 52*a*, the volume of the bush 50 can be reduced by causing the upper edge of the through hole 21 not to overhang from the flat surface 23. Further, the upper seat 52 can be easily formed by matching the amounts of axial overhangs of the upper seat 52 other than the inclination adjustment portion 52*a* in the left-right direction.

Each seat 51 to 54 is connected to each other circumferentially. A boundary M between each seat 51 to 54 is located on a cross section (for example, the cross section of FIG. 10B) that passes along the axis C and a corner right below the bush 50 or a corner left below the bush 50.

The seats 51 to 54 of the axial end surface of the bush 50 on opposite sides of each boundary M incline axially outward up to the curved surface 22*b* toward the extending direction of the boundary M (hereinafter called a "boundary M direction").

The starting point of inclination of the portion inclined toward the boundary M direction (hereinafter called a "boundary M seat") is separate from the through hole 21. Since the starting point of this inclination is located closer to the through hole 21 than the half of the shortest distance from the through hole 21 to the curved surface 22*b* in the boundary M direction, the static spring constant of the bush 50 relative to the compressive deformation in the boundary M direction can be improved while the increase in the volume of the bush 50 is suppressed, like with each seat 51 to 54.

As mentioned above, although the present invention has been explained based on the embodiments, the present invention is not limited to the above embodiments, and it will be apparent that various modifications are possible without departing from the spirit and scope of the invention. For example, the shape of the outer circumferential surface 22 when axially viewed may have a circle shape or a polygonal shape. Additionally, the recessed surface 22*a* of the outer circumferential surface 22 may be omitted.

Although the above embodiments have explained the case where the bushes 20, 30, 40, and 50 are stabilizer bar bushes to be compressed in the axially perpendicular direction between the stabilizer bar 11 and the bracket 12, this case is not necessarily limiting. For example, the present invention may be applied to a cylindrical bush made of an elastic body to be compressed in the axially perpendicular direction between an axial first component attached to a vibration source side such as an engine or a motor and a cylindrical second component attached to a vibration reception side such as a vehicle body. It is noted that this first component may be attached to the vibration reception side and the second component may be attached to the vibration source side. The shape of the through hole 21 or the outer circumferential surface 22 may be appropriately changed to fit the shapes of the first component and second component.

For example, the above embodiments have explained the case where the lower seat 24 below the through hole 21 is inclined axially outward in the downward direction, but this is not limiting. The first seat located in the first direction of axially perpendicular directions relative to the through hole 21 may just incline axially outward toward the first direction, and the first direction is not limited to the downward direction. For example, the first direction may be the upward direction, rightward direction, or leftward direction, or may be an oblique direction relative to the up, down, left, or right. When the upward direction is the first direction, the upper seat 26 is the first seat.

Further, the second seat that inclines axially outwardly toward the second direction opposite to the first direction relative to the through hole 21 may be located to a position in the second direction. For example, when the lower seat 24 is the first seat, the second direction is the upward direction, and the upper seat 26 is the second seat. Additionally, a seat may be provided in a different direction from the first direction or second direction of the axially perpendicular directions relative to the through hole 21. As this direction, the third direction perpendicular to the first direction or the direction inclined from the first direction by 45 degrees is illustrated.

The above embodiments have explained the case where the starting points of the inclinations of the lower seats 24, 31, and 51, the upper seats 26 and 52, the right seats 41 and 53, and the left seats 43 and 54 (the boundaries 25, 27, 32, 42, and 44, the curved lines 55*a* and 56*a*, and the straight lines 55*b* and 56*b*) are in contact with the inner circumferential edge of the through hole 21, but this is not limiting. The starting points of these inclinations may be parallelly moved in the axially perpendicular direction.

For example, when the first seat is provided to a position away from the through hole 21 in the first direction, it is preferable that the starting point of the inclination of the first seat is located closer to the through hole 21 than the half of the shortest distance from the through hole 21 to the outer circumferential surface 22 in the first direction. In this case, the static spring constant of the bush in the first direction can be sufficiently improved by the first seat.

Additionally, the shape of the starting point of the inclination of each seat when axially viewed may be appropriately changed. As that shape, one or multiple straight lines, one or multiple curved lines, and combination of a straight line and a curved line are illustrated. However, when the starting point of inclination of a seat includes only straight lines and particularly includes only a single straight line, the seat can be easily produced.

The above embodiments have explained, for example, the case where the cross sectional shape of the lower seat 24 or the upper seat 26 is the same across the entire length in the left-right direction (the third direction), but is not limiting. For example, the lower seat 24 and the upper seat 26 may be axially expanded in the center in the left-right direction like in the second embodiment, or may be axially recessed in the center in the left-right direction. This is the same in each seat other than the lower seat 24 and upper seat 26.

The above embodiments have explained the case where the axial opposite end surfaces of each bush 20, 30, 40, and 50 are formed identically to each other, but the opposite end surfaces may be different from each other. For example, one axial end surface of each bush 20, 30, 40, and 50 may have only a flat surface. Additionally, while one axial end surface of the bush is the same as that in any one of the above embodiments, the other axial end surface of the bush may be the same as that in another one of the above embodiments.

What is claimed is:

1. An anti-vibration device that is formed of an elastic body to be compressed in an axially perpendicular direction between an outer circumferential surface of an axial first component and an inner circumferential surface of a cylindrical second component and that has a bush formed in a cylindrical shape surrounding an axis, the anti-vibration device comprising:

a through hole forming an inner circumferential surface of the bush into which the first component is insertable; and a first seat formed to a position in a first direction of axially perpendicular directions relative to the through hole in at least one axial end surface of the bush, wherein the first seat is axially outwardly inclined up to an outer circumferential surface of the bush, the outer circumferential surface being contactable with the second component, toward the first direction, and wherein the first seat has a shape in a cross section perpendicular to a third direction, the third direction being perpendicular to the axial direction and the first direction, the shape of the first seat in the cross section being the same across an entire length in the third direction.

2. The anti-vibration device according to claim 1, wherein the first seat is formed to each of axially opposite end surfaces of the bush.

3. The anti-vibration device according to claim 1, wherein the bush includes a second seat formed to a position in a second direction opposite to the first direction relative to the through hole in at least one axial end surface of the bush, and the second seat is inclined outward in an axial direction up to the outer circumferential surface of the bush, the outer circumferential surface being contactable with the second component, toward the second direction.

4. The anti-vibration device according to claim 1, wherein the first seat is formed across an entire length in the third direction perpendicular to the axial direction and the first direction on the axial end surface of the bush.

5. An anti-vibration device that is formed of an elastic body to be compressed in an axially perpendicular direction between an outer circumferential surface of an axial first component and an inner circumferential surface of a cylindrical second component and that has a bush formed in a cylindrical shape surrounding an axis, the anti-vibration device comprising:

a through hole forming an inner circumferential surface of the bush into which the first component is insertable; and a first seat formed to a position in a first direction of axially perpendicular directions relative to the through hole in at least one axial end surface of the bush, wherein the first seat is axially outwardly inclined up to an outer circumferential surface of the bush, the outer circumferential surface being contactable with the second component, toward the first direction, wherein the axial end surface of the bush has a flat surface perpendicular to the axis, and wherein a boundary between the flat surface and the first seat is a straight line perpendicular to the first direction when axially viewed and is a tangent of an inner circumferential edge of the through hole.

6. An anti-vibration device that is formed of an elastic body to be compressed in an axially perpendicular direction between an outer circumferential surface of an axial first component and an inner circumferential surface of a cylindrical second component and that has a bush formed in a cylindrical shape surrounding an axis, the anti-vibration device comprising:

a through hole forming an inner circumferential surface of the bush into which the first component is insertable; and a first seat formed to a position in a first direction of axially perpendicular directions relative to the through hole in at least one axial end surface of the bush, wherein the first seat is axially outwardly inclined up to an outer circumferential surface of the bush, the outer circumferential surface being contactable with the second component, toward the first direction, and wherein the second component is in contact with the outer circumferential surface of the bush without adhesion.

* * * * *